(12) United States Patent
Inoue (10) Patent No.: US 7,311,516 B2
(45) Date of Patent: Dec. 25, 2007

(54) DIE FOR MOLDING DISK SUBSTRATE AND METHOD OF MANUFACTURING DISK SUBSTRATE

(75) Inventor: Kazuo Inoue, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 11 days.

(21) Appl. No.: 10/547,552

(22) PCT Filed: Feb. 25, 2004

(86) PCT No.: PCT/JP2004/002183

§ 371 (c)(1),
(2), (4) Date: Sep. 1, 2005

(87) PCT Pub. No.: WO2004/078446

PCT Pub. Date: Sep. 16, 2004

(65) Prior Publication Data

US 2006/0188600 A1    Aug. 24, 2006

(30) Foreign Application Priority Data

Mar. 3, 2003    (JP) .............................. 2003-055520

(51) Int. Cl.
*B29C 45/00* (2006.01)
(52) U.S. Cl. .................. 425/542; 425/810; 264/1.33; 264/106; 264/107; 264/328.1
(58) Field of Classification Search ................ 425/542, 425/810; 264/1.33, 106, 107, 328.1
See application file for complete search history.

(56) References Cited

U.S. PATENT DOCUMENTS 5,683,630 A    11/1997    Inoue 6,099,287 A *   8/2000   Higashida et al. .......... 425/190
6,142,761 A    11/2000   Arakawa et al.
6,517,339 B1 *  2/2003   Miya et al. .................. 425/542

FOREIGN PATENT DOCUMENTS

| JP | 5-73720 | 10/1993 |
|----|---------|---------|
| JP | 8-66945 | 3/1996 |
| JP | 11-48291 | 2/1999 |
| JP | 2001-310358 | 11/2001 |
| JP | 2001-334534 | 12/2001 |
| JP | 2003-19717 | * 1/2003 |

OTHER PUBLICATIONS

English abstract and computer translation for JP 2003-19717.*

* cited by examiner

*Primary Examiner*—Yogendra N. Gupta
*Assistant Examiner*—Maria Veronica Ewald
(74) *Attorney, Agent, or Firm*—Wenderoth, Lind & Ponack, L.L.P.

(57) ABSTRACT

A die for molding a disk substrate capable of forming fine recessed and projected pits and grooves up to the outer periphery of the disk substrate by preventing low heat conductive elements from peeling off and burrs from occurring on the outer periphery thereof. The die includes a first base die, a second base die disposed oppositely to the first base die, a first low heat conductive element fixed to the first base die, a stamper fixed onto the first low heat conductive element, a second low heat conductive element fixed onto the second base die, and a ring-like regulating member fitted to and in slidable contact with either of the first and second low heat conductive elements. The die is characterized in that the end part of the ring-shaped regulating member is positioned within the range of the outer peripheral side face of the low heat conductive element in slidable contact therewith.

5 Claims, 4 Drawing Sheets

DIE FOR MOLDING DISK SUBSTRATE AND METHOD OF MANUFACTURING DISK SUBSTRATE

BACKGROUND OF THE INVENTION

1. Technical Field

The present invention relates to disk-substrate molding dies and disk-substrate fabricating methods for forming a disk substrate.

2. Description of Related Art

Disk-shaped substrates such as optical-disk substrates and magnetic optical disks are fabricated by charging molten thermoplastic resin into a cavity provided within a die in view of productivity. Fine convex and concave pits and grooves are formed on a stamper made of nickel or the like which is mounted within the die. The stamper comes into contact with the molten thermoplastic resin so that the fine convex and concave pits and grooves on the stamper are transferred to the thermoplastic resin, and thereafter, the molten thermoplastic resin is solidified to provide a desired optical-disk substrate (refer to JP-A No. 8-66945, for example).

In a conventional common die construction disclosed in JP-A No. 8-66945, a fixed-side mirror-surface plate and a movable-side mirror-surface plate, which are controlled in the temperature, are provided at the upper and lower portions of the cavity. A stamper is mounted on the movable-side mirror-surface plate, and the stamper is secured by a stamper holder at its inner side and also secured by an outer ring at its outer side.

On the other hand, as the density is increased, the intervals between fine convex and concave pits and grooves on the stamper are decreased, thus making it more difficult to introduce thermoplastic resin into the fine convex and concave pits and grooves. In order to transfer convex and concave pits and grooves to an optical-disk substrate, it is necessary to raise the temperature of the stamper to above the thermal deformation temperature of the thermoplastic resin. Since it is necessary to further raise the maximum stamper temperature in order to increase the flowability of the thermoplastic resin, it is necessary to further raise the temperature of a heat medium for adjusting the die temperature.

However, if the temperature of the heat medium for adjusting the die temperature is raised to a high temperature, then it will take a long time to cool down the thermoplastic resin charged within the die to a temperature which enables extraction thereof, thus resulting in an increase of the molding time for an optical-disk substrate. Therefore, there has been suggested a die construction employing a heat insulation sheet provided on the back surface of the stamper, in order to make the stamper temperature high even when the heat-medium temperature is low (refer to JP-A No. 62-5824, for example).

Further, there has been disclosed a die construction including low heat-conductivity members provided within an upper die and a lower die, in order to cause the temperature within the upper and lower dies to change in a upper-lower symmetrical manner along the thickwise direction (refer to JP-A No. 7-100866, JP-A No. 9-207141 and JP-A No. 2000-331385, for example).

As the low heat-conductivity members, heat resistant plastics such as polyimide and ceramics have been mainly employed. JP-A No. 62-5824 discloses employing aluminum and cupper as metal low heat-conductivity materials, and JP-A No. 2000-331385 discloses employing bismuth as a low heat-conductivity material.

Further, conventional die constructions have malfunctions as follows.

In a die construction disclosed in JP-A No. 7-100866, a fixed-side stamper and a movable-side stamper include a slow-cooling plate. The fixed-side stamper and the movable-side stamper are secured by an inner holder at their inner sides and are secured by outer rings at their outer sides. Namely, the outer surfaces of the slow-cooling plates are protected by the outer rings. The movable-side stamper is configured and sized to be greater than the fixed-side stamper, and therefore the movable-side outer ring is positioned outside the fixed-side outer ring. Consequently, the fixed-side outer ring holds the fixed-side stamper and also comes into contact with the outer peripheral portion of the movable-side stamper. Namely, the fixed-side outer ring is sandwiched between the fixed-side stamper and the movable-side stamper. Further, the fixed-side outer ring defines the outer peripheral side surface of an optical-disk substrate. As a result, if the resin charge pressure overcomes the die fastening pressure, then the die is opened from the contacting surface of the movable-side stamper. Consequently, resin enters into the gap between the fixed-side outer ring and the movable-side stamper, thus forming burrs on the outer peripheral side surface of the optical disk substrate.

In a die construction disclosed in JP-A No. 9-207141, a nest mounted on a nest-mounting portion of the die is secured by an inner pressing plate at its inner peripheral portion and is secured by an outer pressing plate at its outer peripheral portion. However, since a step is formed at the outer peripheral portion of the nest by the outer pressing plate, there is caused the problem that fine convex and concave pits and grooves can not be formed at the outer peripheral portion of the formed optical disk substrate.

A die construction disclosed in JP-A No. 2000-331385 is configured such that a movable die is slidably fit in a concave-shaped portion of a fixed die. A heat insulation member is mounted on each of the movable die and the fixed die. When the movable die slides, the outer peripheral surface of the heat insulation member mounted on the movable die is slid while being fit against the inner peripheral surface of the concave-shaped portion of the fixed die, and therefore the heat insulation member is prone to be exfoliated from the outer peripheral side surface.

In a die construction disclosed in JP-A No. 9-262838, a heat insulation layer made of a heat insulation polymer and a metal layer are extended from the cavity surface of the base die to the side surface. However, the heat insulation layer and the metal layer provided on the side surface come into contact with a fixed-side mounting plate which is faced thereto and also constitute split surfaces which can be split into two surfaces. Consequently, the heat insulation layer and the metal layer provided on the side surface of the base die will not serve as a sliding portion during the molding operation.

Further, although plastic materials, ceramic materials and metal materials are conventionally employed as low-heat conductivity materials, these low heat-conductivity materials have problems as follows.

Namely, plastic materials generally have poor stiffness and poor surface strengths. Ceramic materials are generally brittle and thus have poor impact resistances. Aluminum and cupper (metal materials) disclosed in JP-A No. 62-5824 have heat conductivities higher than that of the stainless steel constituting the die and therefore can not serve as low heat-conductivity materials. Bismuth disclosed in JP-A No.

2000-331385 is brittle and has poor hardness and therefore has undesirable mechanical characteristics.

SUMMARY OF THE INVENTION

The present invention was made in view of the aforementioned problems and aims at providing disk-substrate molding dies and disk-substrate fabricating methods which prevent exfoliation of the low heat-conductivity members and the occurrence of burrs on the outer periphery and enable forming fine concave and convex pits and grooves up to the outer periphery of the disk substrate.

A disk-substrate molding die according to the present invention includes:

a first base die;

a second base die which is placed to face with the aforementioned first base die;

a first low heat-conductivity member secured to the aforementioned first base die;

a stamper secured on the aforementioned first low heat-conductivity member;

a second low heat-conductivity member secured on the aforementioned second base die; and a ring-shaped restriction member which is fit on one of the aforementioned first low heat-conductivity member and the second low heat-conductivity member and is in slidable contact therewith;

wherein the end portions of the aforementioned ring-shaped restriction member are positioned within the region of the outer peripheral side surface of the low heat-conductivity member which is in slidable contact therewith. A disk-substrate fabricating method according to the present invention is characterized in that a disk substrate is fabricated using the aforementioned disk-substrate molding die.

According to the present invention, even if the resin charge pressure overcomes the die fastening pressure to slightly open the die during charging, it is possible to suppress the occurrence of burrs since there is no gap at the fitting portions of the cavity which is defined by the stamper, the second low heat-conductivity member and the ring-shaped restriction member. Further, since the outer peripheral portion of the disk substrate is flat, fine convex and concave pits and grooves can be formed up to the possible outermost peripheral portion thereof. Further, since the unengaged end portions of the low heat-conductivity member are not positioned at the fitting portions between the low heat-conductivity member and the ring-shaped restriction member, it is possible to prevent exfoliation of the low heat-conductivity member from the base die.

By using the aforementioned die, it is possible to suppress the increase of the molding time even in the case of forming a disk substrate having a higher density than conventional, since convex and concave portions on the stamper can be transferred to the disk substrate even when the temperature for the heat medium for adjusting the die temperature is lower than the heat medium temperature for a die including no heat-conductivity member.

DETAILED DESCRIPTION OF THE INVENTION

Hereinafter, first to sixth embodiments of the present invention will be described in detail with reference to attached drawings.

First Embodiment

First, a first embodiment will be described in detail with reference to FIG. 1 to FIG. 4.

Figure 1:
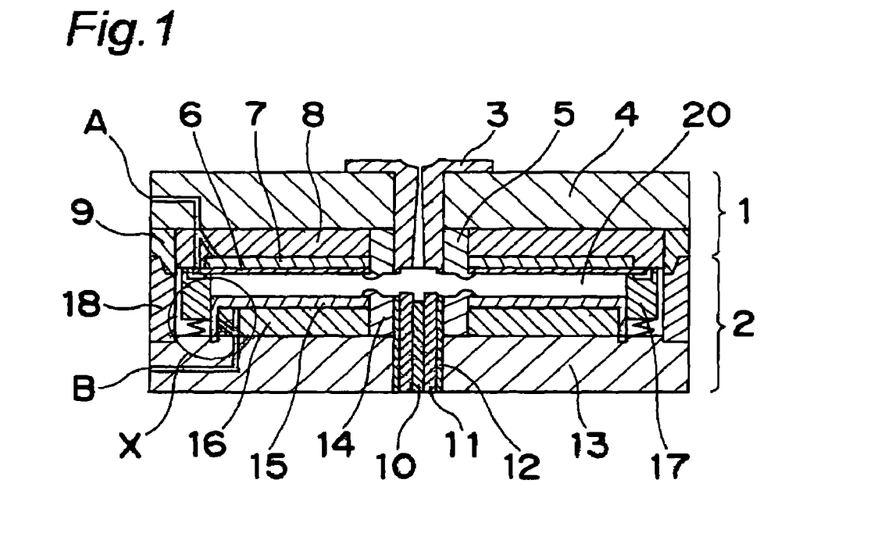
FIG. 1 is a schematic cross-sectional view of a die used in a first embodiment of the present invention.

FIG. 1 illustrates a cross-sectional view of main parts of a disk-substrate molding die according to the first embodiment of the present invention. The molding die includes a fixed die 1 and a movable die 2. The fixed die 1 is constituted by a stamper 6, a low heat-conductivity member 7 as a first low heat-conductivity component, a fixed-side mirror-surface plate 8 as a first base die and a fixed-side base plate 4 which are laminated in the mentioned order from the cavity 20 side.

At the center portion of the fixed die 1, there is provided a sprue bushing 3 for injecting molten resin into the cavity 20. A stamper holder 5 is provided outside of the sprue bushing 3. The stamper holder 5 secures the inner peripheral portions of the stamper 6 and the low heat-conductivity member 7 with respect to the fixed-side mirror-surface plate 8 integrally therewith. The fixed-side base plate 4 and the fixed-side mirror-surface plate 8 are secured through bolts. The outer peripheral portions of the stamper 6 and the low heat-conductivity member 7 are secured to the fixed-side mirror-surface plate 8 through vacuum suction through a suction path A provided through the fixed-side base plate 4 and the fixed-side mirror-surface plate 8. A fixed-side butting ring 9 is provided at the outermost portion of the fixed-side mirror-surface plate 8 and the fixed-side butting ring 9 is secured to the fixed-side base plate 4.

The movable die 2 is constituted by a low heat-conductivity member 15 as a second low heat-conductivity component, a movable-side mirror-surface plate 16 as a second base die and a movable-side base plate 13 which are laminated in the mentioned order from the cavity 20 side. At the center portion of the movable die 2, there are provided an ejector pin 10, a cut punch 11 and an ejector sleeve 12. The ejector pin 10 and the ejector sleeve 12 are configured to protrude during removal of the injection-molded optical disk substrate from the die. The cut punch 11 is for forming an inner hole in the formed optical disk. A low-heatconductivity-member holder 14 is provided outside of the ejector sleeve 12. The inner peripheral portion of the low heat-conductivity member 15 is secured to the movable-side mirror-surface plate 16 by the low-heat-conductivity-member holder 14. The outer peripheral portion and the side surface portion of the low heat-conductivity member 15 are secured with respect to the movable-side mirror-surface plate 16 through vacuum suction through a suction path B provided through the movable-side base plate 13 and the movable-side mirror-surface plate 16.

Figure 2:
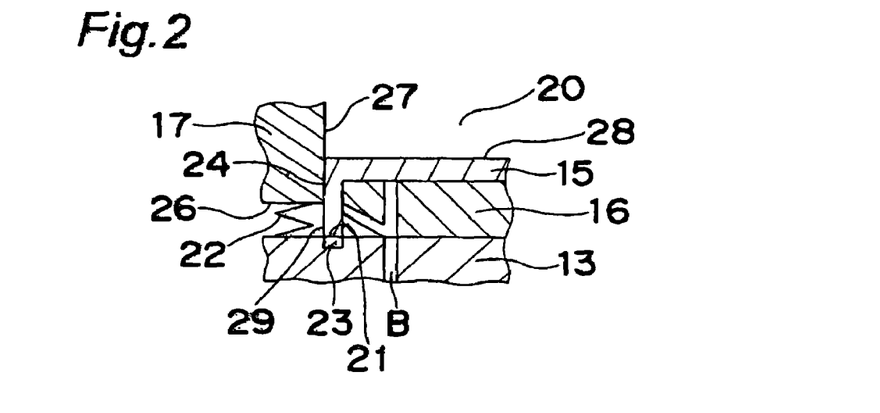
FIG. 2 is an enlarged cross-sectional view of an outer peripheral portion (portion X) of the die used in the first embodiment of the present invention.

FIG. 2 is an enlarged view of the portion X in FIG. 1.

The low heat-conductivity member 15 covers the upper surface and the outer side surface of the movable-side mirror-surface plate 16. An unengaged end portion 21 of the outer side surface 29 of the low heat-conductivity member 15 extends up to a portion just before the movable-side base plate 13.

In the fixed-side base plate 4 and the movable-side base plate 13, there are provided paths for flowing a heat medium such as water therethrough for adjusting the die temperature of the fixed die 1 and the movable die 2. By heating or cooling the heat medium from outside, the temperatures of the fixed die 1 and the movable die 2 are adjusted to predetermined temperatures.

Outside of the low heat-conductivity member 15, there is configured an outer ring 17 for defining the outer-peripheral side surface of the optical-disk substrate such that it is fit on the low heat-conductivity member 15. The outer ring 17 is biased toward the fixed die 1 by a compressing spring 22. In the surface of the movable-side base plate 13, there is formed an annular slot 23 shaped to extend along the unengaged end portion 21 of the low heat-conductivity member 15 which is the lowermost end portion of the outer peripheral side surface 29 thereof. This annular slot 23 prevents the unengaged end portion 21 from coming in contact with the movable-side base plate 13 due to thermal expansion of the low heat-conductivity member 15, even though the unengaged end portion 21 of the low heat-conductivity member 15 extends to the vicinity of the movable-side base plate 13. This can prevent exfoliation of the low heat-conductivity member 15 from the movable-side mirror-surface plate 16.

A movable-side butting ring 18 is provided outside of the outer ring 17. The compression spring 22 of the outer ring 17 and the movable-side butting ring 18 are both secured to the movable-side base plate 13. Consequently, when the movable die 2 is moved vertically, the outer ring 17 and the movable-side butting ring 18 are moved integrally with the movable-side base plate 13. When the fixed die 1 and the movable die 2 are closed, the movable-side butting ring 18 is butted against the fixed-side butting ring 9, thus defining the height of the cavity 20, namely the thickness of the optical-disk substrate.

The inner peripheral side surface 27 of the annular-shaped outer ring 17 is in slidable contact with the outer peripheral side surface 29 of the low heat-conductivity member 15. The inner peripheral side surface 27 of the outer ring 17 and the outer peripheral side surface 29 of the low heat-conductivity member 15 are in slidable contact with each other at a slidable contact surface 24. They are configured to engage with each other such that the lower end portion 26 of the outer ring 17 is below the molding surface 28 of the lower heat-conductivity member 15 which is the uppermost surface thereof and the lower end portion 26 of the outer ring 17 is positioned above the unengaged end portion 21 of the low heat-conductivity member 15 which is the lowermost end portion thereof. Namely, the lower end portion of the outer ring 17 is positioned within the region of the outer peripheral side surface 29 of the low heat-conductivity member 15 which is in slidable contact therewith. Even though the outer ring 17 is slightly slid in the vertical direction along the outer peripheral side surface 29 of the low heat-conductivity member 15, it will not be disengaged from the outer peripheral side surface 29 of the low heat-conductivity member 15.

Figure 3:
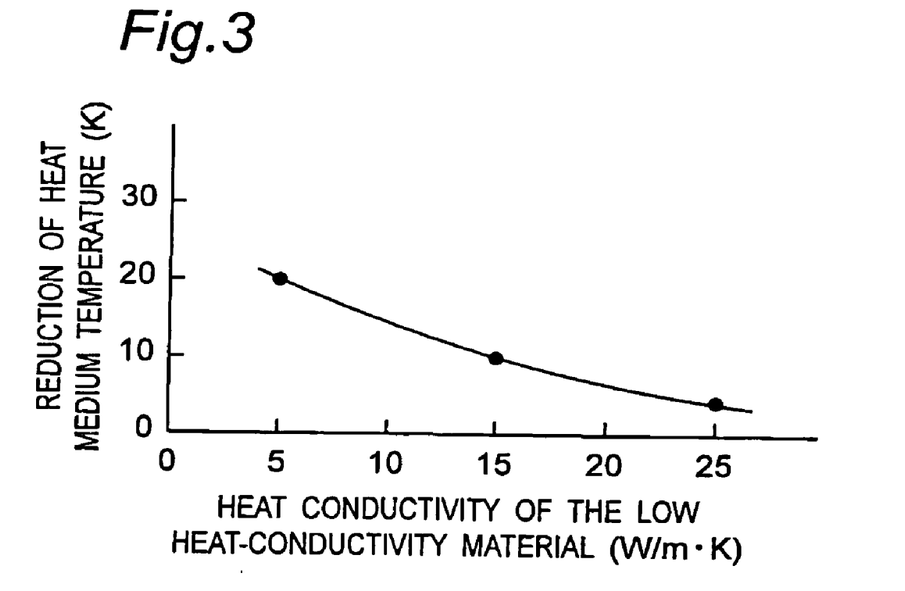
FIG. 3 is a view illustrating the relationship between the heat conductivity of the low heat-conductivity member and the reduction of the temperature of the heat medium for adjusting the die temperature which enables constant transfer to the optical disk, with respect to the heat-medium temperature for the case of not providing the low heat-conductivity member.

Next, investigations were conducted for the heat conductivity which the low heat-conductivity components, namely the low heat-conductivity plate 7 and the low heat-conductivity member 15, are required to have. The fixed-side mirror-surface plate 8 and the movable-side mirror-surface plate 16 are made of a stainless steel. The fixed-side mirror-surface plate 8 and the movable-side mirror-surface plate 16 have a heat conductivity of about 25 W/m·K. On the other hand, experiments were conducted for the case of fabricating the low heat-conductivity plate 7 and the low heat-conductivity member 15 from a stainless steel and for the case of increasing the thicknesses of the fixed-side mirror-surface plate 8 and the movable-side mirror-surface plate 16 instead of providing the low heat-conductivity plate 7 and the low heat-conductivity member 15. Namely, injection moldings were performed using a stamper with a pit density of 40 Gbit/in$^2$ under a condition where the heat-medium temperatures for adjusting the temperatures of the fixed die 1 and the movable die 2 were made equal to determine the heat medium temperature which could realize sufficient transferability. The stamper was made of nickel and had a heat conductivity of 90 W/m·K. The thermoplastic resin was a polycarbonate resin and the molding cycle was 10 seconds. Further, the temperatures at the stamper surface and the mirror surface were measured before and after the start of molding to determine the heat conductivities among the members. On the basis of the data, the heat-medium temperature which could raise the stamper temperature, at a maximum, to the same temperature as that of the case of not providing the low heat-conductivity plate 7 and the low heat-conductivity member 15 was determined. FIG. 3 illustrates the result.

FIG. 3 shows that the heat-medium temperature can be reduced by 10 K or more than the case of not providing the low heat-conductivity plate 7 and the low heat-conductivity member 15 as low heat-conductivity components when the low heat-conductivity plate 7 and the low heat-conductivity member 15 have a heat conductivity of 15 W/m·K or less. Accordingly, it is necessary that the low heat-conductivity member 15 has a heat conductivity of 15 W/m·K or less.

Next, investigations were conducted for the mechanical characteristics that the low heat-conductivity member 15 is required to have. Pure-metal plates with a thickness of 2 mm were prepared and experiments for determining the presence or absence of deformations and surface flaws were conducted. The plates were subjected, ten thousand times, to a load corresponding to the resin charge pressure which was applied during molding and thereafter it was determined whether or not deformation was caused therein. Further, scratching tests using a cloth were conducted and then it was determined whether or not flaws were caused thereon.

Table. 1 illustrates the results of flaws and deformation. There is also illustrated in Table. 1 Young's modulus data since there is a correlation between deformation and Young's modulus indicating the rigidity of material. Further, there is also illustrated Vickers hardness data since there is a correlation between flaws and the Vickers hardness which indicates the surface hardness of material. Further, there is also illustrated the data of the stainless steel constituting the die main body.

TABLE 1

| Material | Young's Modulus (GPa) | Vickers Hardness (Kg/mm$^2$) | Deformation | Flaws |
|---|---|---|---|---|
| Aluminum | 67 | 30 | Present | Present |
| Gold | 78 | 40 | Present | Present |
| Copper | 115 | 60 | Absent | Absent |
| Platinum | 168 | 80 | Absent | Absent |
| Titanium | 106 | 110 | Absent | Absent |
| Nickel | 203 | 120 | Absent | Absent |
| Iron | 190 | 125 | Absent | Absent |
| Stainless Steel | 199 | 200 | Absent | Absent |

From these results, it can be seen that the low heat-conductivity member made of a pure metal material preferably has a Young's modulus of 100 GPa or more and a Vickers hardness of 50 or more.

Figure 4:
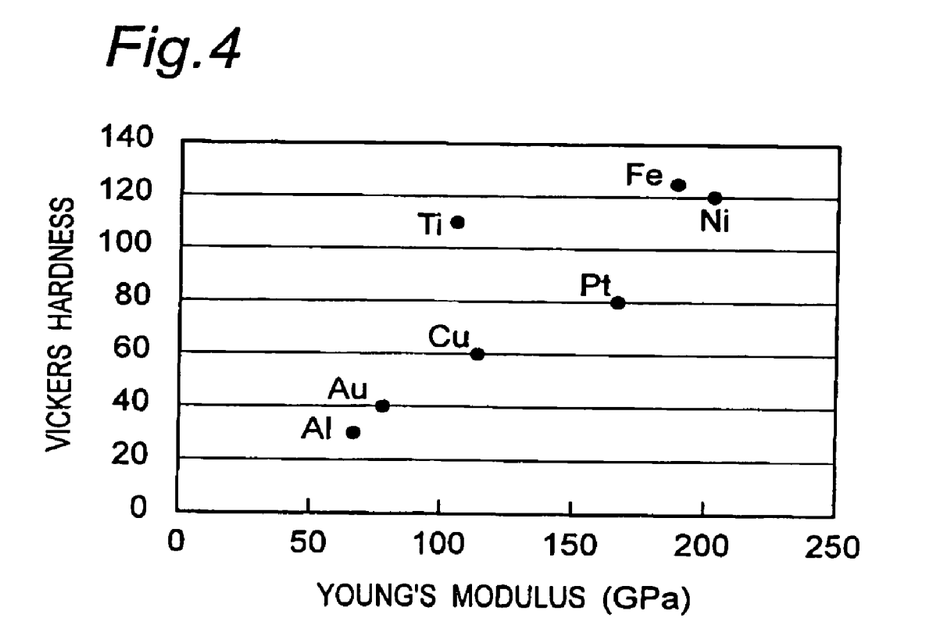
FIG. 4 is a view illustrating the relationship between the Vickers hardness and the Young's modulus of metal elements.

There are relationships between the Vickers hardnesses and the Young's moduluses of pure metal materials other than stainless steel, as in FIG. 4. From FIG. 4, it can be seen that the Vickers hardness tends to be increased with increasing Young's modulus and, when the Young's modulus is equal to or greater than 100 GPa, the Vickers hardness is equal to or greater than 50. Consequently, it is preferable that the low heat-conductivity member 15 has a Young's modulus of 100 GPa or more.

However, there exists no pure metal material having a heat conductivity of 15 W/m·K or less and a Young's modulus of 100 GPa or more.

On the other hand, an alloy has a Young's modulus close to that of the pure metal which is the main ingredient thereof and has a surface hardness higher than that of the pure metal. As a result of earnest studies of various metal materials, it has been found that titanium alloys mainly consisting of titanium have heat conductivities within the range of 7 to 8 W/m·K.

Further, among titanium alloys, alpha-beta alloys and beta alloys have Young's moduluses within the range of 100 to 130 GPa and have Vickers hardnesses of 240 or more as the surface hardnesses. Consequently, it can be seen that titanium alloys exhibit Vickers hardnesses equivalent to that of the stainless steel constituting the die main body and thus are sufficiently hard.

The fixed die 1 and the movable die 2 are positioned with the fit between the fixed-side butting ring 9 and the movable-side butting ring 18. Namely, the positioning in the direction towards the center is performed with the taper portions provided on the fixed-side butting ring 9 and the movable-side butting ring 18 while the positioning in the thickwise direction is performed with the flat portions thereof. This results in a configuration capable of suppressing wear due to slide of the outer ring 17 with respect to the low heat-conductivity member 15. The greater the hardness of the materials of them, the more effectively wear can be suppressed. It has been proven that, when the outer ring 17 is made of a stainless steel similarly to the other die members, if the low heat-conductivity member 15 has a Vickers hardness of 100 or more, then there will be no practical problem. Consequently, it is preferable that the low heat-conductivity member 15 has a Vickers hardness of 100 or more. Obviously, it is possible to form the outer ring 17 from the same material as that of the low heat-conductivity plate 7 and the low heat-conductivity member 15.

The low heat-conductivity plate 7 and the heat-conductivity member 15 as the low heat-conductivity components are made of Ti-6Al-4V, which is AMS (Aerospace Material Specification) 4911. This material is an alloy material containing 5.50 to 6.75 wt. % aluminum and 3.50 to 4.50 wt. % vanadium and the balance thereof consists of titanium. This material has a Young's modulus of 113 GPa. The thickness thereof is 2 mm.

Injection moldings were performed using a stamper with a pit density of 40 Gbit/in$^2$ under a condition where the die temperatures of the fixed die 1 and the movable die 2, namely the heat-medium temperatures thereof, were made equal. Then, the heat medium temperature which enabled sufficiently transferring a predetermined pit shape was determined. The used thermoplastic resin was a polycarbonate resin and the molding cycle was 10 seconds. Experiments of injection-molding were conducted by varying the heat-medium temperature in steps of 5 K. As a result, it was proven that the predetermined pit shape could be obtained even when the heat medium temperature was lower by about 15 K than the case of not providing the low heat-conductivity plate 7 and the low heat-conductivity member 15.

It is preferable that the low heat-conductivity plate 7 and the low heat-conductivity member 15 have thicknesses of 2 mm or more in view of ensuring workability. When the low heat-conductivity plate 7 and the low heat-conductivity member 15 have thicknesses of 2 mm or more, the resin injected into the cavity 20 of the die disperses heat at substantially a constant initial rate. As the thicknesses of the low heat-conductivity plate 7 and the low heat-conductivity member 15 are increased, the heat capacities of the low heat-conductivity plate 7 and the low heat-conductivity member 15 are increased, which hinders cooling of the low heat-conductivity plate 7 and the low heat-conductivity member 15 resulting in an increase of the fabrication time of an optical-disk substrate. Accordingly, the low heat-conductivity plate 7 and the low heat-conductivity member 15 have thicknesses of 10 mm or less and preferably have thicknesses of 5 mm or less.

The aforementioned titanium alloy may contain aluminum, vanadium, molybdenum, iron and chromium, in addition to titanium. Aluminum has the property of enhancing the creep strength. Vanadium, molybdenum, iron and chromium have the property of increasing the Young's modulus and the property of improving the workability. It is preferable that the aluminum content is within the range of 2 wt. % to 9 wt. % and the vanadium content is within the range of 2 wt. % to 16 wt. % in view of the mechanical characteristics and the workability. It is more preferable that the aluminum content is within the range of 2 wt. % to 7 wt. % and the vanadium content is within the range of 2 wt. % to 6 wt. %. In this case, it is possible to form a thin plate member having sufficient mechanical characteristics and workability. If the aluminum content is greater than the aforementioned content, the Young's modulus will be degraded and, if the vanadium content is greater than the aforementioned content, the workability will be degraded. Further, if any of the aluminum content and the vanadium content is smaller than the aforementioned content, it is impossible to offer the effects thereof.

It is preferable that the low heat-conductivity plate members 7 and 15 have surface roughness (center roughness) of 0.2 micrometer or less, in view of ensuring the flatness of the surface of the optical-disk substrate to which transfer is performed with the stamper 6.

If the surface roughness of the low heat-conductivity plates 7 and 15 is greater than 6.2 micrometer as the center roughness, undulations may be transferred to the surface of the formed optical-disk substrate, which may result in degradation of focus signals and tracking signals of the optical-disk substrate thus preventing sufficient reading of signals. Obviously, while the surface roughness of the low heat-conductivity member 15 has influences only during recording, erasing or reproducing of data onto or from the disk substrate through laser light passed through the optical-disk substrate, the surface roughness of the low heat-conductivity member 15 hardly has influences in the case of recording, erasing or reproducing of data through laser light which is incident from the opposite side without being passed though the optical-disk substrate.

Since there are provided the low heat-conductivity plate 7 and the low heat-conductivity member 15 as low heat-conductivity components at the upper and lower portion of the cavity 20 of the die, respectively, it is not necessary to significantly increase the heat medium temperature for adjusting the die temperature. This enables fabrication of a high-density optical-disk substrate within a molding time equivalent to molding times which have been required for those having conventional densities, without increasing surface deflections and warpage.

Further, the inner peripheral side surface 27 of the outer ring 17 which defines the outer peripheral side surface of the optical-disk substrate is fitted on the outer peripheral side surface 29 of the low heat-conductivity member 15 which forms the lower surface of the cavity 20. Consequently, even if the resin charge pressure overcomes the die fastening pressure and thus the die is slightly opened when molten resin has been charged, no gap will be generated in the cavity 20 since the outer ring 17 is biased towards the fixed die 1 by the compression spring 22. This prevents the occurrence of burrs on the outer peripheral side surface of the optical disk substrate.

Further, the low heat-conductivity member 15 which is in contact with the slidable outer ring 17 is constituted by a member having sufficient mechanical characteristics, which eliminates the possibility of failures of the low heat-conductivity member 15 due to wear of the slidable contact surface 24 of the low heat-conductivity member 15.

Further, the unengaged end portion 21 of the low heat-conductivity member 15 which is the lowermost end portion of the outer peripheral side surface 29 thereof is positioned below the lower end portion 26 of the outer ring 17 and the lower end portion 26 of the inner peripheral side surface 27 of the outer ring 17 is always overlapped with the outer peripheral side surface 29 of the low heat-conductivity member 15. Namely, the lower end portion 26 of the outer ring 17 is within the region of the outer peripheral side surface 29 of the low heat-conductivity member 15 which is in slidable contact therewith, which prevents the side surface of the low heat-conductivity member 15 from riding up and exfoliating from the movable-side mirror-surface plate 16.

Further, the free flat portion extends up to the outer peripheral portion of the cavity 20, and therefore fine concave and convex pits and grooves will be formed up to the possible outermost peripheral portion of the optical-disk substrate formed by injection molding.

Further, since the low heat-conductivity member 7 as a low heat-conductivity component is not directly faced to the cavity 20 and also it will not be slid and rubbed, it is possible to form the low heat-conductivity member 7 from the same material as that of the low heat-conductivity member 15 as a low heat-conductivity component, although it is not necessary.

Further, while the low heat-conductivity member 7 and the stamper 6 of the fixed-side die 1 are vacuum-suctioned through the common suction path A, it is also possible to vacuum-suction them individually through separate suction paths.

Further, while a polycarbonate resin is used as the thermoplastic resin, it is possible to employ a polyolefin resin, an acrylic resin and other resins.

Second Embodiment

Figure 5:
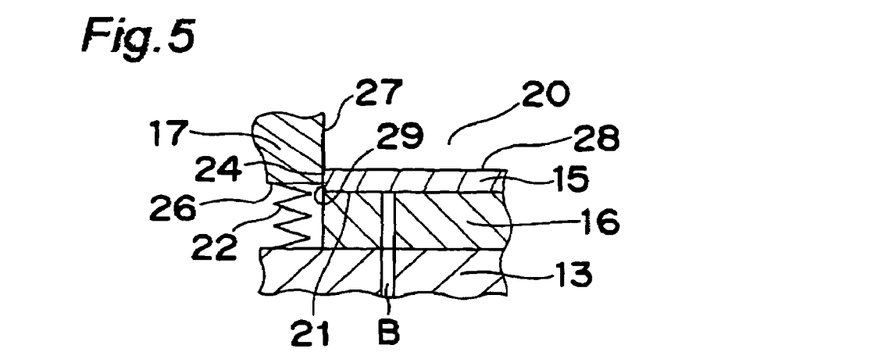
FIG. 5 is an enlarged cross-sectional view of an outer peripheral portion of a die used in a second embodiment of the present invention.

FIG. 5 illustrates a detailed cross-sectional view of an outer portion of a disk-substrate molding die according to a second embodiment of the present invention. The disk-substrate molding die is similar to that according to the first embodiment at the point that the low heat-conductivity member 15 extends to the outer peripheral side surface of the movable-side mirror-surface plate 16 and the lower end portion 26 of the outer ring 17 is positioned above the unengaged end portion 21 of the low heat-conductivity member 15 which is the lowermost surface thereof. However, in FIG. 5, the disk-substrate molding die is configured such that, even if the outer ring 17 slides, the lower end portion 26 of the outer ring 17 will be stopped at a portion above the unengaged end portion 21 of the low heat-conductivity member 15 and will not reach the position of the bonding surface at which the low heat-conductivity member 15 is bonded to the movable-side mirror-surface plate 16. Consequently, similarly, the lower end portion 26 of the outer ring 17 lies within the region of the outer peripheral side surface 29 of the low heat-conductivity member 15 which is in slidable contact therewith, which eliminates the possibility of exfoliation of the low heat-conductivity member 15 from the movable-side mirror-surface plate 16.

Further, by employing a material having a Young's modulus of 100 GPa or more for the low heat-conductivity member 15, it is possible to eliminate the possibility of failures due to wear of the portion which slides against the outer ring 17. Further, similarly to in the first embodiment, the outer peripheral portion of the cavity 20 is made flat and therefore fine concave and convex pits and grooves will be formed up to the possible outermost peripheral portion of the optical-disk substrate formed by injection molding.

Further, since there are provided the low heat-conductivity plate 7 and the low heat-conductivity member 15 at the upper and lower portions of the cavity 20 within the die, it is not necessary to significantly raise the temperature of the heat medium for adjusting the die temperature. This enables fabrication of a high-density optical-disk substrate within a molding time equivalent to molding times which have been required for those having conventional densities, without increasing surface deflections and warpage. Further, the outer ring 17 which defines the outer peripheral side surface of the optical-disk substrate is fit around the low heat-conductivity member 15 forming a single wall surface of the cavity 20. Consequently, even if the resin charge pressure overcomes the die fastening pressure and thus the die is slightly opened when molten resin has been charged, no gap will be generated in the cavity 20 since the outer ring 17 is biased towards the fixed die 1 by the compression spring 22. This prevents the occurrence of burrs on the outer peripheral side surface of the optical disk substrate.

Third Embodiment

Figure 6:
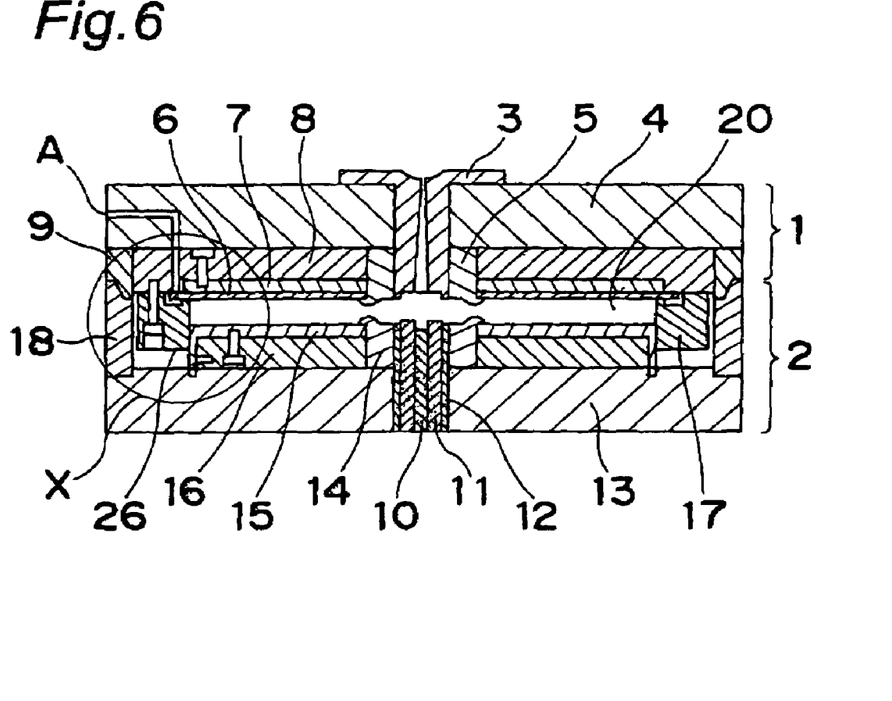
FIG. 6 is a schematic cross-sectional view of a die used in a third embodiment of the present invention.
Figure 7:
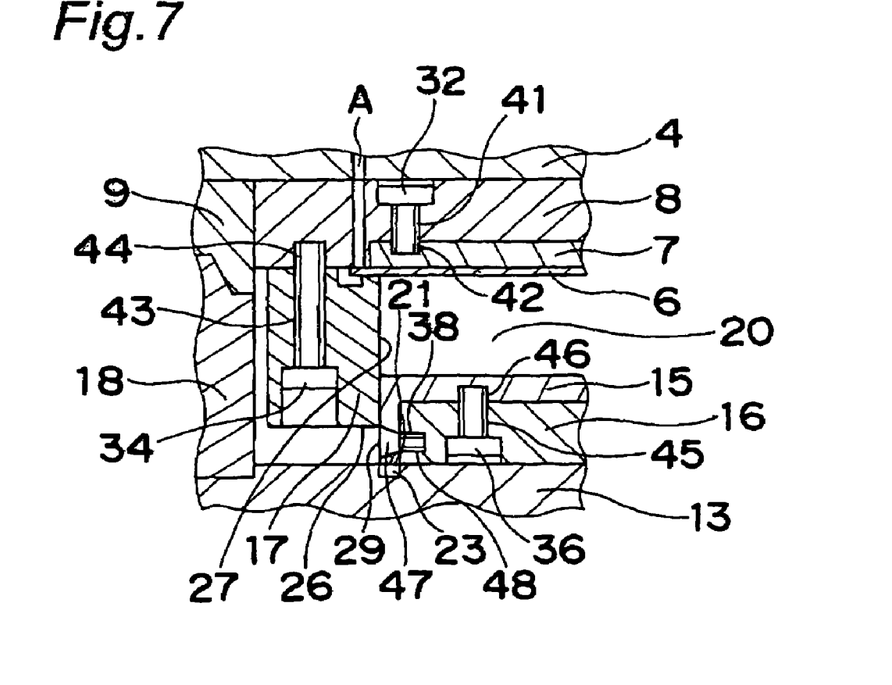
FIG. 7 is an enlarged cross-sectional view of an outer peripheral portion of the die used in the third embodiment of the present invention.

FIG. 6 is a schematic cross-sectional view of a disk-substrate molding die according to a third embodiment of the present invention. FIG. 7 illustrates an enlarged detailed view of the portion X at the outer peripheral portion of the die.

The disk-substrate molding die according to the third embodiment is different from that of the first embodiment in the method of securing the outer ring 17 and the method of securing the low heat-conductivity plate 7 and the low heat-conductivity member 15.

A non-through thread hole 42 is provided in the upper surface of the low heat-conductivity plate 7 at an outer portion thereof. A through hole 41 is provided in the fixed-side mirror-surface plate 8 at the position which coincides with the aforementioned thread hole 42. The low heat-conductivity plate 7 is secured to the fixed-side mirror-surface plate 8 through a threaded fastener 32 screwed into the thread hole 42.

A non-through thread hole 44 is provided in the lower surface of the fixed-side mirror-surface plate 8 at an outer portion thereof. A through hole 43 is provided through the outer ring 17 at the position which coincides with the aforementioned thread hole 44. The outer ring 17 is secured to the fixed-side mirror-surface plate 8 through a threaded fastener 34 screwed into the thread hole 44.

A non-through thread hole 46 is provided in the upper surface of the low heat-conductivity member 15 in the movable die 2 at an outer portion thereof. A through hole 45 is provided in the fixed-side mirror-surface plate 16 at the position which coincides with the aforementioned thread hole 46. The low heat-conductivity member 15 is secured to the movable-side mirror-surface plate 16 through a threaded fastener 36 screwed into the thread hole 46.

A countersink hole 47 is provided in the outer peripheral wall surface 29 of the low heat-conductivity member 15 in the movable die 2 at a lower portion thereof. A non-through hole 48 is provided in the movable-side mirror-surface plate 16 at the position which coincides with the aforementioned countersink hole 47. The outer peripheral side surface 29 of the low heat-conductivity member 15 is secured to the movable-side mirror-surface plate 16 through a threaded fastener 38 screwed into the thread hole 48 in an embedded manner. Consequently, even if the inner peripheral side surface 27 of the outer ring 17 is slid against the outer peripheral side surface 29 of the low heat-conductivity member 15, it will not rub against the head of the threaded fastener 38.

By using the disk-substrate molding die according to the third embodiment, it is also possible to form an optical-disk substrate by injection molding of a thermoplastic resin such as polycarbonate and polyolefin.

According to the third embodiment, similarly, since there are provided the low heat-conductivity plate 7 and the low heat-conductivity member 15 as low heat-conductivity components at the upper and lower portion of the cavity 20 of the die, respectively, it is not necessary to significantly increase the temperature of the heat medium for adjusting the die temperature. This enables fabrication of a high-density optical-disk substrate within a molding time equivalent to molding times which have been required for those having conventional densities, without increasing surface deflections and warpage. Further, the outer ring 17 which defines the outer peripheral side surface of the optical-disk substrate is fit on the low heat-conductivity member 15 forming the lower surface of the cavity 20. Consequently, even if the resin charge pressure overcomes the die fastening pressure and thus the die is slightly opened when molten resin has been charged, no gap will be generated in the cavity 20 since the outer ring 17 is secured on the fixed die 1. This prevents the occurrence of burrs on the outer peripheral side surface of the optical disk substrate. Further, the low heat-conductivity member 15 which is in contact with the slidable outer ring 17 is constituted by a member having sufficient mechanical characteristics, which eliminates the possibility of failures of the low heat-conductivity member 15 due to wear of the slidable contact surface 24 of the low heat-conductivity member 15. Further, the unengaged end portion 21 of the low heat-conductivity member 15 which is the lowermost end portion of the outer peripheral side surface 29 thereof is positioned below the lower end portion 26 of the outer ring 17 and the lower end portion 26 of the outer ring 17 is always overlapped with the low heat-conductivity member 15, thereby preventing the side surface of the low heat-conductivity member 15 from riding up and exfoliating from the movable-side mirror-surface plate 16. Further, the free flat portion extends up to the outer peripheral portion of the cavity 20, and therefore fine concave and convex pits and grooves will be formed up to the possible outermost peripheral portion of the optical-disk substrate formed by injection molding.

Further, since the low heat-conductivity member 7 is not directly faced to the cavity 20 and also it will not be slid and rubbed, it is possible to form the low heat-conductivity member 7 from the same material as that of the low heat-conductivity member 15 as a low heat-conductivity component, although it is not necessary.

According to the third embodiment, since the outer peripheral portions of the stamper 6 and the low heat-conductivity member 7 are secured to the fixed-side mirror-surface plate 8 through the threaded fastener 34 for securing the outer ring 17, it is not necessary to secure the stamper 6 through vacuum suction through the suction path A. While a spot facing hole and a countersink hole are provided as thread-mounting portions, it is also possible to interchange these holes or provide completely the same holes.

Fourth Embodiment

Figure 8:
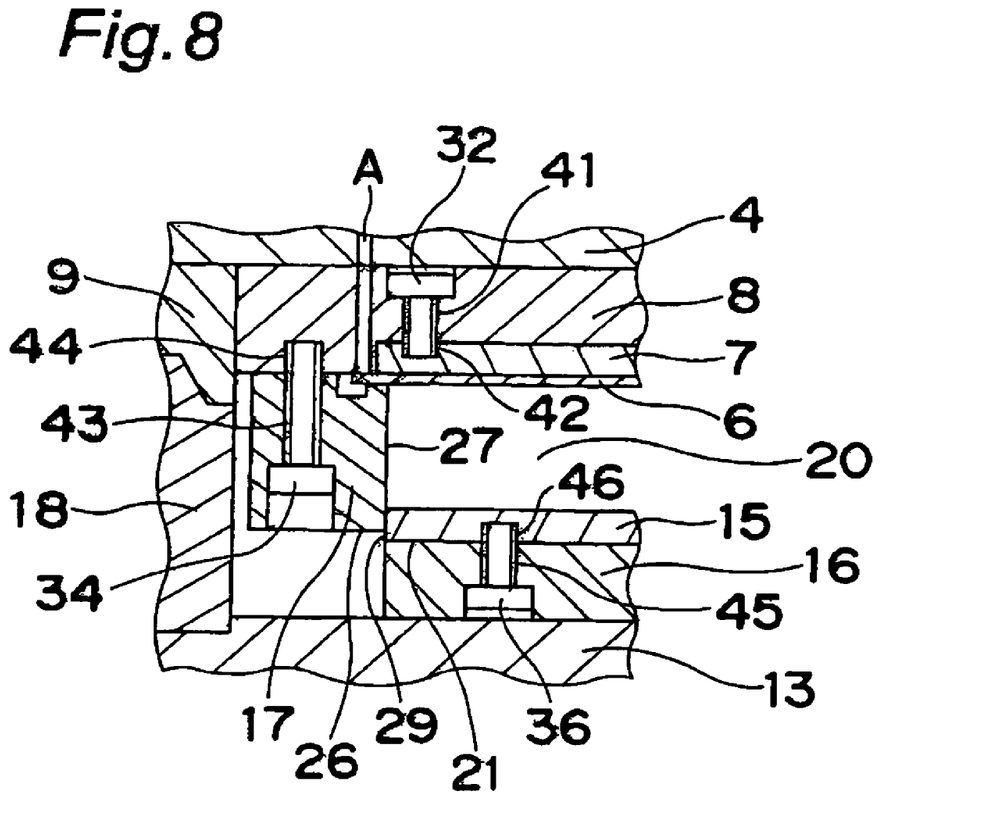
FIG. 8 is an enlarged cross-sectional view of an outer peripheral portion of the die used in the fourth embodiment of the present invention.

FIG. 8 illustrates a detailed cross-sectional view of an outer peripheral portion of a disk-substrate molding die according to a fourth embodiment of the present invention. The disk-substrate molding die according to the fourth embodiment is configured such that the outer peripheral side surface 29 of the low heat-conductivity member 15 secured on the movable-side mirror-surface plate 16 is in slidable contact with the inner peripheral side surface 27 of the outer ring 17 secured to the fixed-side mirror-surface plate 8.

The disk-substrate molding die according to the forth embodiment is similar to the disk-substrate molding die according to the third embodiment in that the low heat-conductivity member 15 extends to the outer peripheral portion of the movable-side mirror-surface plate 16 and the lower end portion 26 of the outer ring 17 is positioned above the unengaged end portion 21 of the low heat-conductivity member 15 which is the lowermost surface thereof. However, in FIG. 5, the disk-substrate molding die is configured such that the lower end portion 26 of the outer ring 17 will be stopped at a portion above the unengaged end portion 21 of the low heat-conductivity member 15 and will not reach the bonding surface between the low heat-conductivity member 15 and the movable-side mirror-surface plate 16, even if the movable die 2 is vertically moved. Consequently, in this case, similarly, the lower end portion 26 of the outer ring 17 lies within the region of the outer peripheral side surface 29 of the low heat-conductivity member 15 which is in slidable contact therewith, which eliminates the possibility of exfoliation of the low heat-conductivity member 15 from the movable-side mirror-surface plate 16.

Further, by employing a material having a Young's modulus of 100 GPa or more as the material of the low heat-conductivity member 15, it is possible to eliminate the possibility of failures due to wear of the portion of the low heat-conductivity member 15 which slides against the outer ring 17. Further, similarly to in the first embodiment, the outer peripheral portion of the cavity 20 is made flat and therefore fine concave and convex pits and grooves can be formed up to the possible outermost peripheral portion of the optical disk substrate formed by injection molding.

Further, since the low heat-conductivity plate 7 and the low heat-conductivity member 15 are provided at the upper and lower portions of the cavity 20 within the die, it is not necessary to significantly raise the temperature of the heat medium for adjusting the die temperature. This enables fabrication of a high-density optical-disk substrate within a molding time equivalent to molding times which have been required for those having conventional densities, without increasing surface deflections and warpage. Further, the die is configured such that the outer ring 17 which defines the outer peripheral side surface of the optical disk is fit on the low heat-conductivity member 15 forming one of the wall surfaces of the cavity 20. Consequently, even if the resin charge pressure overcomes the die fastening pressure to slightly open the die after charging the molten resin, no gap will be generated within the cavity 20 since the outer ring 17 is biased towards the fixed die 1. This prevents the occurrence of burrs on the outer peripheral side surface of the optical disk substrate.

Fifth Embodiment

A disk-substrate molding die according to a fifth embodiment of the present invention is characterized in that the surface of the low heat-conductivity member 15 is covered with a metal material with high stiffness in comparison with the disk-substrate molding dies according to the first to fourth embodiments. Namely, it is covered with a metal material with high stiffness, in order to facilitate the maintenance of the mirror surface of the titanium alloy used as the low heat-conductivity member 15. It is preferable that this coating layer has more excellent mechanical characteristics than those of the titanium alloy. The coating layer preferably has a Young's modulus of 150 GPa or higher and more preferably has a Young's modulus of 200 GPa or higher. Metal materials such as nickel, chromium, tungsten, molybdenum and the like are suitable. The coating layer is constituted by at least a single material selected from a group consisting of nickel, chromium, tungsten, and molybdenum. As the coating method, vacuum deposition, sputtering, plating and the like may be employed. A coating layer formed by surface treatment such as plating tends to have greater hardness than bulk products. For example, an electroplated nickel has a Vickers hardness of about 300 and an electroless-plated nickel has a Vickers hardness of about 500 while nickel bulks have a Vickers hardness of 120 according to Table. 1. Further, by applying heat treatment to an electroless-plated coating layer at a temperature within the range of 350 to 400 degree. C, the Vickers hardness thereof is increased to about 900. An electroplated chromium has a Vickers hardness of about 1000, while chromium bulks generally have a Vickers hardness of about 400. In order to maintain the mirror-surface quality of the low heat-conductivity member 15, a hard coating layer is formed on the low heat-conductivity member 15. As the coating method for forming the coating layer, electroplating or electroless-plating methods are preferable. Also, it is preferable that heat treatment is applied to the coating layer after the coating layer is formed by a plating process or the like.

After the formation of the hard coating layer on the surface of the low heat-conductivity member 15, polishing is applied thereto using a buff or the like to finish the surface of the coating layer into a mirror surface. It is preferable that the coating layer has a surface roughness of 0.2 micrometer or less as a center roughness. This is for suppressing undulations and the like on the surface of the injection-molded optical disk substrate to alleviate the influence thereof on the transmission and the reflection of light, thus improving the signal quality.

The disk-substrate molding die according to the fifth embodiment can be used to perform injection molding of a thermoplastic resin, such as polycarbonate and polyolefin, to form an optical disk substrate.

According to the fifth embodiment, similarly, since the low heat-conductivity plate 7 and the low heat-conductivity member 15 are provided at the upper and lower portion of the cavity 20 of the dies, respectively, it is not necessary to significantly raise the temperature of the heat medium for adjusting the die temperature. This enables fabrication of a high-density optical-disk substrate within a molding time equivalent to molding times which have been required for those having conventional densities, without increasing surface deflections and warpage. Further, the die is configured such that the outer ring 17 which defines the outer peripheral side surface of the optical disk substrate is fitted on the low heat-conductivity member 15 forming the lower surface of the cavity 20. Consequently, even if the resin charge pressure overcomes the die fastening pressure to slightly open the die after charging the molten resin, no gap will be generated within the cavity 20 since the outer ring 17 is secured to the fixed die 1. This prevents the occurrence of burrs on the outer peripheral side surface of the optical disk substrate. Further, the low heat-conductivity member 15 which is in contact with the slidable outer ring 17 is constituted by a member having sufficient mechanical characteristics, which eliminates the possibility of failures of the low heat-conductivity member 15 due to were of the sliding surface 24 of the low heat-conductivity member 15. Further, the unengaged end portion 21 of the low heat-conductivity member 15 which is the lowermost end portion of the outer peripheral side surface 29 thereof is positioned below the lower end portion 26 of the outer ring 17 and the lower end portion 26 of the outer ring 17 is always overlapped with the low heat-conductivity member 15, thereby preventing the side surface of the low heat-conductivity member 15 from riding up and exfoliating from the movable-side mirror-surface plate 16. Further, the free flat portion extends to the outer peripheral portion of the cavity 20, and therefore fine concave and convex pits and grooves can be formed up to the possible outermost peripheral portion of the injection-molded optical disk substrate.

While a metal coating layer is provided only on the low heat-conductivity member 15 in this case, it is obvious that such a metal coating layer may be provided on the low heat-conductivity plate 7. In this case, it is necessary that they have substantially the same thermal expansion coefficient for preventing exfoliation, and therefore it is preferable that the low heat-conductivity plate 7 is made of metal.

Sixth Embodiment

In a disk-substrate molding die according to a sixth embodiment of the present invention, a lubricating thin layer made of DLC (damond-like carbon) or a lubricating thin layer made of a material containing fluorine is provided on the metal coating layer on the low heat-conductivity member 15 described in the fifth embodiment. This can reduce the friction coefficient of the fitting surface between the low heat-conductivity member 15 and the outer ring 17 during sliding, thus offering the effect of improving the durability of both the low heat-conductivity member 15 and the outer ring 17. Also, it is possible to provide a thin layer made of DLC (diamond-like carbon) or a thin film made of a material containing fluorine, directly on the surface of the low heat-conductivity plate 7 or the low heat-conductivity member 15. As described above, the aforementioned lubricating thin layer may be provided either on the surface of the low heat-conductivity plate 7 or the low heat-conductivity member 15 which is a low heat-conductivity component or on the surface of the metal coating layer.

Obviously, according to the sixth embodiment, since the low heat-conductivity plate 7 and the low heat-conductivity member 15 are provided at the upper and lower portion of the cavity 20 of the dies, respectively, it is not necessary to significantly raise the temperature of the heat medium for adjusting the die temperature. This enables fabrication of a high-density optical-disk substrate within a molding time equivalent to molding times which have been required for those having conventional densities, without increasing surface deflections and warpage. Further, the outer ring 17 which defines the outer peripheral side surface of the optical disk substrate is fitted on the low heat-conductivity member 15 forming the lower surface of the cavity 20. Consequently, even if the resin charge pressure overcomes the die fastening pressure to slightly open the die after charging the molten resin, no gap will be generated within the cavity 20 since the outer ring 17 is secured to the fixed die 1. This prevents the occurrence of burrs on the outer peripheral side surface of the optical disk substrate. Further, the low heat-conductivity member 15 which is in contact with the slidable outer ring 17 is constituted by a member having sufficient mechanical characteristics, which eliminates the possibility of failures of the low heat-conductivity member 15 due to wear of the sliding surface 24 of the low heat-conductivity member 15. Further, the unengaged end portion 21 of the low heat-conductivity member 15 which is the lowermost end portion of the outer side peripheral surface 29 thereof is positioned below the lower end portion 26 of the outer ring 17 and the lower end portion 26 of the outer ring 17 is always overlapped with the low heat-conductivity member 15, thereby preventing the side surface of the low heat-conductivity member 15 from riding up and exfoliating from the movable-side mirror-surface plate 16. Further, the free flat portion extends to the outer peripheral portion of the cavity 20, and therefore fine concave and convex pits and grooves can be formed up to the possible outermost peripheral portion of the injection-molded optical disk substrate.

In the first and second embodiments, the low heat-conductivity plate 7 and the low heat-conductivity member 15 are secured to the base dies which are the fixed-side mirror-surface plate 4 and the movable-side mirror-surface plate 16 through vacuum suction. In the third and fourth embodiments, the low heat-conductivity plate 7 and the low heat-conductivity member 15 are secured to the base dies which are the fixed-side mirror-surface plate 4 and the movable-side mirror-surface plate 16 by threaded fasteners. Also, the low heat-conductivity plate 7 and the low heat-conductivity member 15 may be secured to the base dies which are the fixed-side mirror-surface plate 4 and the movable-side mirror-surface plate 16 through both vacuum suction and fastening with threaded fasteners.

While in the present embodiments there have been described cases of installing the stamper in the fixed-side die, it is obvious that the stamper may be installed in the movable-side die.

While in the present embodiments there have been described cases where the injection-molded product is an optical-disk substrate, the present invention is applicable to any products having a disk shape.

While in the aforementioned embodiments there have been described an injection-molded product formed by melting a thermoplastic resin outside of the die and then injecting the molten resin into the die, the present invention is applicable to compression-molded products fabricated by melting a thermoplastic rein within the heated die and then solidifying it. Then, fabrication methods employing the dies according to the present invention are included in the scope of the claims of the present application.

The disk-substrate molding dies and the disk-substrate fabricating methods according to the present invention are usable for molding methods for molding thermoplastic resin using a die to form an optical disk substrate or the like. Further, they are applicable to applications such as processes for glossing the surface of thermoplastic resin.

What is claimed is:

1. A disk-substrate molding die including:
    a first base die;
    a second base die which is placed to face the first base die;
    a first low heat-conductivity member secured to the first base die;
    a stamper secured on the first low heat-conductivity member;
    a second low heat-conductivity member secured on the second base die; and
    a ring-shaped restriction member which is fit on one of the first low heat-conductivity member and the second low heat-conductivity member and is in slidable contact therewith, wherein:
    an end portion of the ring-shaped restriction member is positioned within a region of an outer peripheral side surface of the low heat-conductivity member which is in slidable contact therewith,
    the low heat-conductivity member, which is in slidable contact with the ring-shaped restriction member, covers the outer peripheral side surface of the corresponding base die, and
    one of the first and second base dies has a slot which receives an extending end portion of the corresponding low heat-conductivity member when the corresponding low heat-conductivity member extends to a position which covers wholly the outer peripheral side surface of the corresponding base die.

2. The disk-substrate molding die of claim 1, wherein at least one of the first and second low heat-conductivity members has a Young's modulus of 100 GPa or more.

3. The disk-substrate molding die of claim 2, wherein at least one of the first and second low heat-conductivity members has a heat conductivity of 15 W/m·K or less.

4. The disk-substrate molding die of claim 2, wherein at least one of the first and second low heat-conductivity members has a Vickers hardness of 100 kg/mm$^2$ or more.

5. A disk-substrate molding die including:
a first base die;
a second base die which is placed to face the first base die;
a first low heat-conductivity member secured to the first base die;
a stamper secured on the first low heat-conductivity member;
a second low heat-conductivity member secured on the second base die; and
a ring-shaped restriction member which is fit on one of the first low heat-conductivity member and the second low heat-conductivity member and is in slidable contact therewith, wherein:
an end portion of the ring-shaped restriction member is positioned within a region of an outer peripheral side surface of the low heat-conductivity member which is in slidable contact therewith,
at least one of the first and second low heat-conductivity members has a Young's modulus of 100 GPa or more,
at least one of the first and second low heat-conductivity members mainly consists of titanium, and
the low heat-conductivity member has an aluminum content within the range of 2 wt. % to 9 wt. % and a vanadium content within the range of 2 wt. % to 16 wt. %.

* * * * *